(12) United States Patent
Liu et al.

(10) Patent No.: US 12,416,834 B2
(45) Date of Patent: Sep. 16, 2025

(54) ELECTROMAGNETIC WAVE CONTROL APPARATUS

(71) Applicants: HUAWEI TECHNOLOGIES CO., LTD., Shenzhen (CN); Southern University of Science and Technology, Shenzhen (CN)

(72) Inventors: Yanjun Liu, Shenzhen (CN); Rui Guo, Shenzhen (CN); Tenghao Li, Shenzhen (CN); Mengjia Cen, Shenzhen (CN); Jiawei Wang, Shenzhen (CN)

(73) Assignees: Huawei Technologies Co., Ltd., Shenzhen (CN); Southern University of Science and Technology, Shenzhen (CN)

( * ) Notice: Subject to any disclaimer, the term of this patent is extended or adjusted under 35 U.S.C. 154(b) by 0 days.

(21) Appl. No.: 18/492,400

(22) Filed: Oct. 23, 2023

(65) Prior Publication Data

US 2024/0045272 A1 Feb. 8, 2024

Related U.S. Application Data

(63) Continuation of application No. PCT/CN2022/080166, filed on Mar. 10, 2022.

(30) Foreign Application Priority Data

Apr. 22, 2021 (CN) .......................... 202110435765.8

(51) Int. Cl.
*G02F 1/1337* (2006.01)

(52) U.S. Cl.
CPC .. *G02F 1/133707* (2013.01); *G02F 1/133723* (2013.01); *G02F 1/133738* (2021.01);
(Continued)

(58) Field of Classification Search
None
See application file for complete search history.

(56) References Cited

U.S. PATENT DOCUMENTS 10,942,398 B1 * 3/2021 Calafiore .............. G03F 7/0002
2003/0002156 A1 * 1/2003 Hobbs ............... G02F 1/133371
349/198

(Continued)

FOREIGN PATENT DOCUMENTS

CN 1967324 A 5/2007
CN 104049424 A 9/2014
(Continued)

*Primary Examiner* — Phu Vu
(74) *Attorney, Agent, or Firm* — Leydig, Voit & Mayer, Ltd.

(57) ABSTRACT

An electromagnetic wave control apparatus includes an upper electrode layer, a lower electrode layer, a liquid crystal layer, and a first metamaterial layer disposed between the upper electrode layer and the lower electrode layer. The first metamaterial layer includes a first array including alignment unit structures. A first surface of the alignment unit structure is a surface that is of the alignment unit structure and that faces away from the liquid crystal layer. A length-to-width ratio of the first surface of the alignment unit structure is greater than 1. A length of the first surface, a width of the first surface, and a spacing between two adjacent alignment unit structures range from 1 nm to 5000 nm.

19 Claims, 13 Drawing Sheets

(52) U.S. Cl.
CPC .... *G02F 1/133742* (2021.01); *G02F 2202/30* (2013.01); *G02F 2202/36* (2013.01)

(56) References Cited

U.S. PATENT DOCUMENTS

| | | | |
|---|---|---|---|
| 2006/0262250 A1* | 11/2006 | Hobbs | G02B 5/3058 |
| | | | 349/96 |
| 2007/0121210 A1* | 5/2007 | Sato | G02F 1/133371 |
| | | | 359/569 |
| 2016/0209680 A1 | 7/2016 | Chen et al. | |
| 2017/0199425 A1* | 7/2017 | Nam | G02F 1/23 |
| 2018/0143470 A1 | 5/2018 | Oh et al. | |

FOREIGN PATENT DOCUMENTS

| | | | | | |
|---|---|---|---|---|---|
| CN | 108885365 | A | | 11/2018 | |
| CN | 110865475 | B | | 5/2020 | |
| CN | 112117390 | A | * | 12/2020 | ......... H01L 27/3218 |
| CN | 212647221 | U | | 3/2021 | |
| WO | 2010137386 | A1 | | 12/2010 | |

\* cited by examiner (a) (b)

(a) (b)

ELECTROMAGNETIC WAVE CONTROL APPARATUS

CROSS-REFERENCE TO RELATED APPLICATIONS

This application is a continuation of International Application No. PCT/CN2022/080166, filed on Mar. 10, 2022, which claims priority to Chinese Patent Application No. 202110435765.8, filed on Apr. 22, 2021. The disclosures of the aforementioned applications are hereby incorporated by reference in their entireties.

TECHNICAL FIELD

The present disclosure relates to an electromagnetic wave control apparatus, and more specifically, to an electromagnetic wave control apparatus by using a liquid crystal layer.

BACKGROUND

Liquid crystal materials are widely used in electromagnetic wave adjustment and control apparatuses. Under action of an external electric field, liquid crystal molecules are in a specific arrangement status due to anisotropic electrical properties. At the same time, the liquid crystal molecules represent different optical effect due to anisotropic optical properties of the liquid crystal molecules. These features of the liquid crystal molecules can be used for implementing flexible adjustment and control on an electromagnetic wave. In the adjustment and control apparatus based on the liquid crystal material, the liquid crystal molecules need to be aligned in advance, and then the liquid crystal molecules are adjusted and controlled by adding an external drive voltage, to control the electromagnetic wave. In an existing adjustment and control apparatus, to obtain complete $2\pi$ phase adjustment and control, a thick liquid crystal layer material is usually selected, which is unfavorable to miniaturization and integration of a device, and causes a large drive voltage required by the apparatus. In addition, in the existing apparatus, liquid crystal molecules are aligned by using a conventional friction alignment method, which has disadvantages such as large losses and difficult control of product uniformity. Factors such as a result of liquid crystal alignment and a thickness of a liquid crystal layer are critical to manufacturing a liquid crystal device having excellent photoelectric features. Therefore, this application provides a new electromagnetic wave control apparatus, to better implement adjustment and control on an electromagnetic wave while implementing alignment on liquid crystal molecules.

SUMMARY

The present disclosure provides an electromagnetic wave control apparatus. A metamaterial structure is combined with a liquid crystal material, to enable the apparatus to have both a liquid crystal alignment capability and a phase adjustment and control capability.

According to a first aspect, an electromagnetic wave control apparatus is provided. The electromagnetic wave control apparatus includes an upper electrode layer, a lower electrode layer, and a liquid crystal layer and a first metamaterial layer that are disposed between the upper electrode layer and the lower electrode layer. The first metamaterial layer includes a first array including alignment unit structures. A length-width ratio of a first surface of the alignment unit structure is greater than 1. The first surface is a surface that is of the unit structure and that faces away from the liquid crystal layer. A length of the first surface, a width of the first surface, and a spacing between two adjacent alignment unit structures range from 1 nm to 5000 nm.

Therefore, in the electromagnetic wave control apparatus in this embodiment of this application, an array includes alignment unit structures that each have a length-width ratio greater than 1 and a sub-wavelength size, to enable an electromagnetic wave to accumulate a specific phase delay when liquid crystal molecules are aligned. This enhances phase adjustment and control of a reflected or transmitted electromagnetic wave. Accordingly, a thickness of the liquid crystal layer in the apparatus can be reduced, and performance of a liquid crystal device can be improved.

With reference to the first aspect, in some implementations in the first aspect, the length of the first surface, the width of the first surface, and the spacing range from $\lambda/100$ to $\lambda$, where $\lambda$ is a wavelength of the electromagnetic wave incident to the first metamaterial layer, and the wavelength of the electromagnetic wave ranges from 100 nm to 2000 nm.

Therefore, in the electromagnetic wave control apparatus in this embodiment of this application, a size of the alignment unit structure is $\lambda/100$ to $\lambda$ of a wavelength of the incident electromagnetic wave, to enable the incident electromagnetic wave to accumulate a specific phase delay, and implement phase adjustment and control for electromagnetic waves with different wavelengths.

With reference to the first aspect, in some implementations in the first aspect, the length-width ratio of the first surface is greater than or equal to 1.5.

Therefore, for the electromagnetic wave control apparatus in this embodiment of this application, an array includes alignment unit structures that each have a length-width ratio greater than or equal to 1.5, to enable the liquid crystal molecules to be arranged in a major axis direction of the alignment unit structure. In this way, alignment effect on the liquid crystal molecules is better. At the same time, a larger length-width ratio of the alignment unit structure indicates better alignment effect of the apparatus on the liquid crystal molecules.

With reference to the first aspect, in some implementations in the first aspect, the first metamaterial layer is located on a lower surface of the liquid crystal layer.

With reference to the first aspect, in some implementations in the first aspect, the apparatus further includes: a second metamaterial layer. The second metamaterial layer is located on an upper surface of the liquid crystal layer. The second metamaterial layer includes a second array including the alignment unit structures.

With reference to the first aspect, in some implementations in the first aspect, an alignment direction of the second array is perpendicular to an alignment direction of the first array.

Therefore, for the electromagnetic wave control apparatus in this embodiment of this application, two metamaterial layers whose alignment directions are perpendicular are respectively disposed on the upper surface of the liquid crystal layer and the lower surface of the liquid crystal layer, to enable a polarization direction of a linearly polarized electromagnetic wave to be twisted by about 90° after the linearly polarized electromagnetic wave is transmitted by the apparatus. A special optical waveguide feature of the liquid crystal molecules in the apparatus may be used to manufacture a liquid crystal device with a better extinction ratio.

With reference to the first aspect, in some implementations in the first aspect, an alignment direction of the second array is parallel to an alignment direction of the first array.

With reference to the first aspect, in some implementations in the first aspect, the apparatus further includes: a polyimide (PI) frictional layer. The PI frictional layer is located on an upper surface of the liquid crystal layer. An alignment direction of the PI frictional layer is perpendicular to an alignment direction of the first array.

Therefore, for the electromagnetic wave control apparatus in this embodiment of this application, the metamaterial layer and the PI frictional layer are respectively disposed on the upper surface of the liquid crystal layer and the lower surface of the liquid crystal layer, and an alignment direction of the metamaterial layer for the liquid crystal molecules and an alignment direction of the PI frictional layer for the liquid crystal molecules are perpendicular to each other, to enable the polarization direction of the linearly polarized electromagnetic wave to be twisted by about 90° after the linearly polarized electromagnetic wave is transmitted by the apparatus. The special optical waveguide feature of the liquid crystal molecules in the apparatus may be used to manufacture the liquid crystal device with the better extinction ratio.

With reference to the first aspect, in some implementations in the first aspect, the apparatus further includes a third array including the alignment unit structures. An alignment direction of the third array is perpendicular to the alignment direction of the first array.

Therefore, the electromagnetic wave control apparatus in this embodiment of this application, two arrays whose alignment directions are perpendicular can be reused, to implement alignment on the liquid crystal molecules in two different directions at a same metamaterial layer. In comparison with conventional friction alignment and optical alignment technologies, the alignment direction of the liquid crystal molecules can be flexibly controlled, and integration of the liquid crystal device can be implemented.

With reference to the first aspect, in some implementations in the first aspect, the alignment unit structure is a rectangular column.

Therefore, for the electromagnetic wave control apparatus in this embodiment of this application, an array includes rectangular column unit structures that each have a length-width ratio greater than or equal to 1, so that the apparatus is easy to prepare. In addition, a shape of the rectangular column unit structure is regular, so that the liquid crystal molecules may be neatly arranged on a surface of the metamaterial layer. This facilitates the alignment on the liquid crystal molecules and may improve working efficiency of the apparatus.

With reference to the first aspect, in some implementations in the first aspect, the alignment unit structure is a wedge-shaped column.

With reference to the first aspect, in some implementations in the first aspect, the alignment unit structure is a triangular prism. The first surface is a side surface of the triangular prism. A ratio of a height of the triangular prism to a side length of a bottom triangle is greater than 1.

With reference to the first aspect, in some implementations in the first aspect, the alignment unit structure is an elliptical column. The first surface is a bottom surface of the elliptical column. A ratio of a major axis of the bottom surface of the elliptical column to a minor axis of the bottom surface of the elliptical column is greater than 1.

With reference to the first aspect, in some implementations in the first aspect, the alignment unit structure is an ellipsoid. The first surface is a projection plane of the ellipsoid. A ratio of a major axis of the projection plane of the ellipsoid to a minor axis of the projection plane of the ellipsoid is greater than 1.

Therefore, for the electromagnetic wave control apparatus in this embodiment of this application, a shape of the alignment unit structure is not limited. The alignment on the liquid crystal molecules may be implemented as long as the length-width ratio of the alignment unit structure on the projection plane is greater than 1, so that the array including the alignment unit structures is easier to prepare.

With reference to the first aspect, in some implementations in the first aspect, a material of the alignment unit structure is metal.

With reference to the first aspect, in some implementations in the first aspect, a material of the alignment unit structure is a dielectric material.

With reference to the first aspect, in some implementations in the first aspect, the apparatus further includes a spacer layer. The metamaterial layer is disposed on a surface of the spacer layer.

Therefore, for the electromagnetic wave control apparatus in this embodiment of this application, the metamaterial layer is disposed on the surface of the spacer layer, to improve efficiency of an alignment apparatus, so that the alignment apparatus is easier to prepare, and arrangement and the alignment on the liquid crystal molecules can be better implemented.

With reference to the first aspect, in some implementations in the first aspect, a spatial light modulator is a transmissive spatial light modulator.

With reference to the first aspect, in some implementations in the first aspect, the spatial light modulator is a reflective spatial light modulator.

Therefore, for the apparatus provided in this application, a metamaterial is combined with the liquid crystal material, to construct an electromagnetic wave control apparatus that has both the liquid crystal alignment capability and the phase adjustment and control capability. Based on the foregoing apparatus, the alignment on the liquid crystal molecules may be implemented by using a simple metamaterial structure. This overcomes disadvantages such as large losses of conventional friction alignment and difficult control, and implements the flexible arrangement and the alignment on the liquid crystal molecules. In addition, the array includes the alignment unit structures that each have the sub-wavelength size, to enable the electromagnetic wave to accumulate the specific phase delay in a transmission process of the electromagnetic wave. This enhances the phase adjustment and control of the reflected or the transmitted electromagnetic wave. Accordingly, the thickness of the liquid crystal layer in the apparatus can be reduced, the performance of the liquid crystal device can be improved, and the integration of the liquid crystal device can be improved.

DESCRIPTION OF EMBODIMENTS

In embodiments of this application, a metamaterial structure is combined with a liquid crystal material, to implement adjustment and control on an electromagnetic wave. As an artificial microstructure with a sub-wavelength size, the metamaterial structure can assist a liquid crystal device to implement flexible adjustment and control on the electromagnetic wave. At the same time, the liquid crystal device constructed by using a metamaterial helps promote miniaturization and integration of a product. In addition, a metamaterial layer may be integrated on a photonic chip by using a photolithography technology. This facilitates large-scale manufacturing and processing of a device.

Specifically, in embodiments of this application, nanounit structures with a specific length-width ratio are neatly arranged as one metamaterial layer, to form an alignment layer in a "groove" shape, so as to implement an alignment function on liquid crystal molecules. In addition, the nanounit structures arranged in sequence present a structure similar to an antenna array, and the metamaterial structure may control features such as polarization, a phase, an amplitude, and dispersion of the electromagnetic wave based on a resonance feature of a nano-antenna array. Therefore, for the apparatus provided in this application, a metamaterial is combined with the liquid crystal material, to construct an electromagnetic wave control apparatus that has both a liquid crystal alignment capability and a phase adjustment and control capability.

The following describes technical solutions of this application with reference to accompanying drawings. It is clear that the described embodiments are merely some but not all of embodiments of this application. All other embodiments obtained by a person of ordinary skill in the art based on embodiments of this application without creative efforts shall fall within the protection scope of this application.

Figure 1:
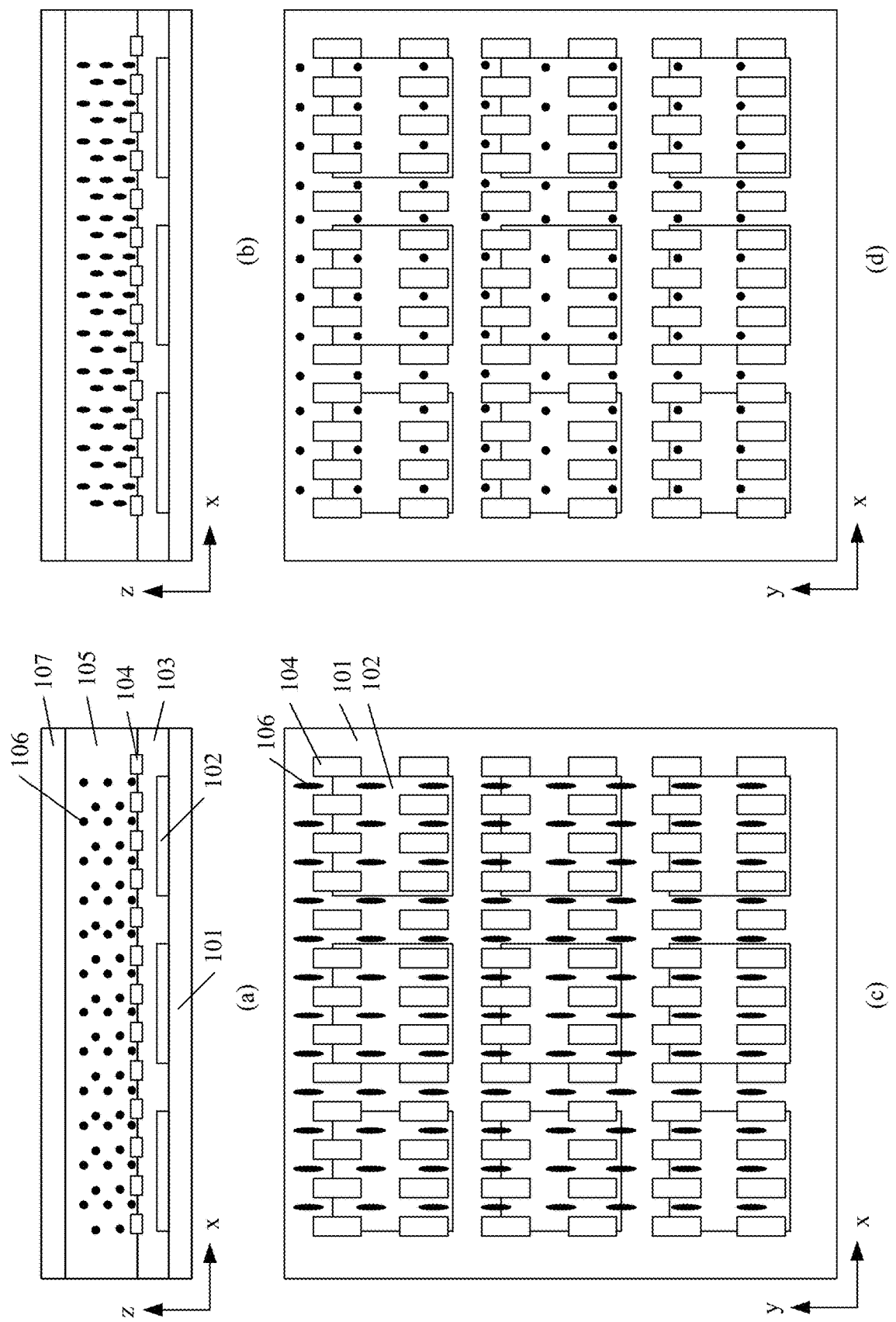
FIG. 1 is a schematic diagram of an electromagnetic wave control apparatus applicable to an embodiment of this application.

FIG. 1 is a schematic diagram of an electromagnetic wave control apparatus 100 applicable to an embodiment of this application. (a) in FIG. 1 is a cross sectional view of the apparatus 100 without a drive voltage. As shown in (a) in FIG. 1, the apparatus 100 includes: a lower electrode layer (including a substrate 101 and an electrode array 102 on a surface of the substrate 101), and an upper electrode layer 107. A liquid crystal layer 105 is between the upper electrode layer and the lower electrode layer, and includes liquid crystal molecules 106 and a metamaterial layer 104 including several unit structures. Optionally, the apparatus 100 may further include a spacer layer 103, configured to optimize structural efficiency. The metamaterial layer 104 may be disposed on a surface of the spacer layer 103. Alternatively, the apparatus 100 may not include the spacer layer 103. This is not limited in this application.

(c) in FIG. 1 shows a top view of the metamaterial layer 104 in (a) in FIG. 1. The metamaterial layer 104 includes an array including neatly arranged alignment unit structures. The apparatus 100 is described in FIG. 1 by using a rectangular column unit structure as an example. The rectangular column unit structure has a specific length-width ratio, so that the metamaterial layer 104 presents a micro "groove" structure. The liquid crystal molecules may lie down in a micro "groove" formed by the rectangular column unit structure. Therefore, in the liquid crystal layer 105, liquid crystal molecules on a surface of an electrode are arranged in a major axis direction of the rectangular column unit structure. The liquid crystal molecules between upper and lower electrode layer tend to be arranged in parallel due to action of van der Waals force.

Different voltages are applied between the upper electrode layer and the lower electrode layer, to enable the liquid crystal molecules in the apparatus 100 to rotate on a yz plane. A material of the electrode layer may be indium tin oxide (ITO), or may be another conductive material. This is not limited in this application.

(b) in FIG. 1 is a cross sectional view of the apparatus 100 when a drive voltage is applied. (d) in FIG. 1 is a top view of the metamaterial layer 104 in (b) in FIG. 1. It can be seen from (b) in FIG. 1 and (d) in FIG. 1 that the liquid crystal molecules rotate on the yz plane perpendicular to the metamaterial layer by applying the driving voltage. When a voltage is applied enough, the liquid crystal molecules tend to be arranged parallel to a direction of an electric field under attraction of the electrostatic field, in other words, a major axis direction of the liquid crystal molecules is perpendicular to an xy plane. In this case, the liquid crystal molecules cannot adjust and control a polarization direction of an incident light beam.

Figure 2:
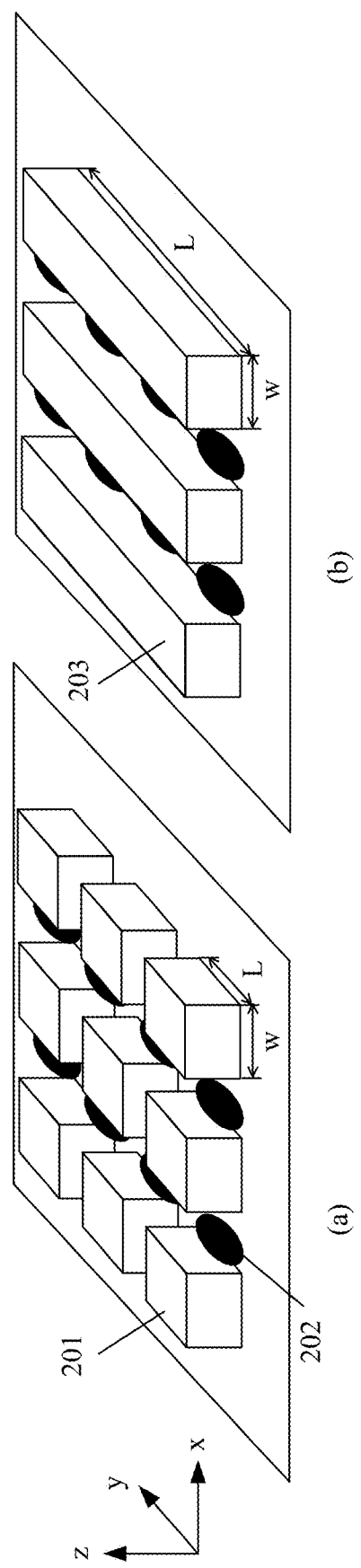
FIG. 2 is a schematic diagram of some alignment unit structures applicable to an embodiment of this application.

(a) in FIG. 2 is a schematic diagram of some alignment unit structures at the metamaterial layer 104.

Specifically, in (a) in FIG. 2, a length-width ratio of a first surface of each alignment unit structure 201 is greater than 1. The first surface is a surface that is of the unit structure 201 and that faces away from the liquid crystal layer. As shown in (a) in FIG. 2, the first surface of the alignment unit structure 201 may be a lower surface of the rectangular column. As shown in (a) in FIG. 2, several rectangular column unit structures 201 are arranged neatly. W indicates a width of the rectangular column unit structure, and L indicates a length of the rectangular column unit structure. The length-width ratio L/W of each rectangular colunm unit structure 201 needs to be greater than 1, to enable the metamaterial layer 104 to present a "groove" parallel to a y-axis direction on the xy plane, so that liquid crystal molecules 202 are arranged in a "groove" direction. In this way, alignment on the liquid crystal molecules 202 is implemented. The rectangular column unit structure 201 needs to be of a sub-wavelength size with a geometric size less than an incident wavelength of a surface of the structure. If the length-width ratio L/W of the unit structure is large enough, a strip-shaped rectangular column 203 may be presented, as shown in (b) in FIG. 2.

An array including alignment unit structures that each have a length-width ratio equal to 1 in an x-axis direction has a same period as the array including alignment unit structures that each have a length-width ratio equal to 1 in the y-axis direction. Therefore, isotropic optical properties are presented. However, in this embodiment of this application, the length-width ratio of the alignment unit structure 201 at the metamaterial layer 104 is greater than 1, and alignment unit structures are not symmetric. Therefore, the array including the alignment unit structures is anisotropic, to implement a function of alignment on liquid crystal molecules. To implement a better alignment result, the length-width ratio of the alignment unit structure 201 may be greater than or equal to 1.5. A larger length-width ratio of the alignment unit structure 201 indicates better alignment effect on the liquid crystal molecules.

Therefore, for the electromagnetic wave control apparatus in this embodiment of this application, the array includes alignment unit structures that each have a length-width ratio greater than 1, to enable the liquid crystal molecules to be arranged in a major axis direction of the alignment unit structure. In this way, an objective of alignment on the liquid crystal molecules is achieved. The apparatus has simple structure and is easy to prepare, can better control arrangement of the liquid crystal molecules, and reduce wear at the alignment layer, to better implement the alignment on the liquid crystal molecules.

Further, in the schematic diagram of the alignment unit structure in (a) in FIG. 2, a length L of the first surface of the alignment unit structure 201, a width W of the first surface of the alignment unit structure 201, and a spacing between two adjacent alignment unit structures 201 all range from 1 nm to 5000 nm. In this case, an electromagnetic wave reflected or transmitted by the metamaterial layer 104 obtains a specific phase delay.

More specifically, the length L of the first surface, the width W of the first surface, and the spacing between two adjacent alignment unit structures 201 all range from $\lambda/100$ to $\lambda$, where $\lambda$ is a wavelength of an electromagnetic wave incident to the apparatus. A wavelength range of the electromagnetic wave may range from 100 nm to 5000 nm. Further, a wavelength range of the electromagnetic wave may range from 100 nm to 2000 nm. It should be understood that for electromagnetic waves in different wavelength ranges, alignment unit structures of different sizes may be selected for the apparatus in this embodiment of this application. A size of the alignment unit structure needs to be related to a wavelength of the electromagnetic wave that needs to be adjusted and controlled. In addition to an electromagnetic wave ranging from 100 nm to 2000 nm, the apparatus provided in this embodiment of this application may be further configured to adjust and control an electromagnetic wave with another wavelength, for example, a terahertz band or a radio band. This is not limited in this application.

It should be understood that the phase delay obtained by the electromagnetic wave reflected or transmitted by the metamaterial layer 104 may exist in the following cases: Because the array including the alignment unit structures 201 presents a structure similar to an antenna array, resonance occurs on an electromagnetic wave incident to a surface of the array. The electromagnetic wave incident to the apparatus is reflected or transmitted by the array including the alignment unit structures, to obtain a specific resonance phase. Alternatively, because the alignment unit structure 201 is a structure with the sub-wavelength size, there is a specific optical path difference between the electromagnetic wave reflected or transmitted by the metamaterial layer 104 and the incident electromagnetic wave, so that the reflected or transmitted electromagnetic wave obtains a transmission phase. Alternatively, because a size of the alignment unit structure 201 in the x-axis direction is different from a size of the alignment unit structure 201 in the y-axis direction, and anisotropy exists in adjustment and control of a left-handed or right-handed polarized electromagnetic wave, the incident electromagnetic wave obtains a geometric phase.

It should be understood that the phase delay obtained by the reflected or transmitted electromagnetic wave is related to factors such as a size of the alignment unit structure 201 and an equivalent refractive index of the liquid crystal layer. Due to the phase delay generated at the metamaterial layer 104, phases accumulated in sending the electromagnetic wave by the apparatus 100 may be increased. On one hand, with a same thickness of a liquid crystal material, the phase delay generated by the metamaterial layer 104 enables the apparatus 100 to generate deep phase modulation. On the other hand, due to the phase delay accumulated at the metamaterial layer, a thinner liquid crystal material may be used, to implement $2\pi$ phase modulation for the electromagnetic wave. As a thickness of the material of the liquid crystal layer decreases, a drive voltage required for adjusting and controlling the electromagnetic wave may be reduced, so that heat generation between upper and lower electrodes may be reduced, and crosstalk between adjacent alignment unit structures may be reduced. This reduces a pixel size of the liquid crystal device, and improves device resolution.

Therefore, in the electromagnetic wave control apparatus in this embodiment of this application, an array includes the alignment unit structures that each have a length-width ratio greater than 1 and the sub-wavelength size, to enable the electromagnetic wave to accumulate the specific phase delay on the basis of the alignment on the liquid crystal molecules. This can enhance phase adjustment and control of the reflected or transmitted electromagnetic wave. Accordingly, a thickness of the liquid crystal layer in the apparatus can be reduced, and performance of a liquid crystal device can be improved.

It should be understood that, in addition to the rectangular column unit structure shown in FIG. 2, the alignment unit structure may alternatively be another geometric structure with a specific length-width ratio. In an optional implementation, the alignment unit structure may be a wedge-shaped column 301 shown in (a) in FIG. 3. A length-width ratio L/W of a first surface of each wedge-shaped column 301 also needs to be greater than 1. The first surface of the wedge-shaped column 301 is a surface that faces away from a liquid crystal layer. As shown in (a) in FIG. 3, the first surface may be a side surface of the wedge-shaped column 301.

Figure 3:
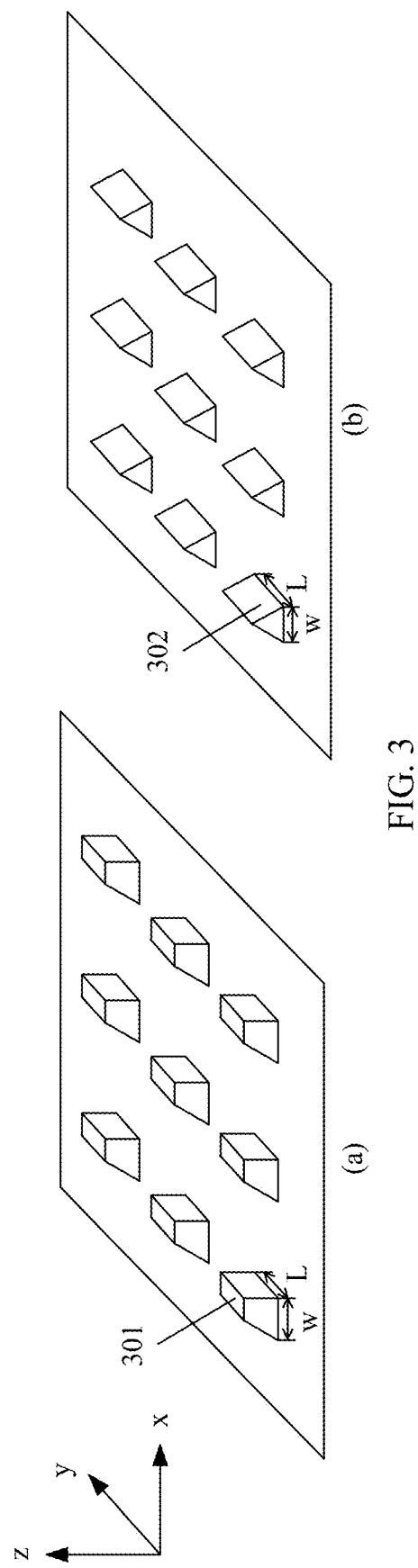
FIG. 3 is a schematic diagram of an alignment unit structure applicable to an embodiment of this application.

The alignment unit structure may alternatively be a triangular prism 302 shown in (b) in FIG. 3. As shown in (b) in FIG. 3, a first surface of the triangular prism 302 is a surface that faces away from the liquid crystal layer. For example, the first surface may be any side surface of the triangular prism 302. A ratio of a height of the triangular prism 302 to a side length of a bottom triangle of the triangular prism 302 is greater than 1.

Figure 4:
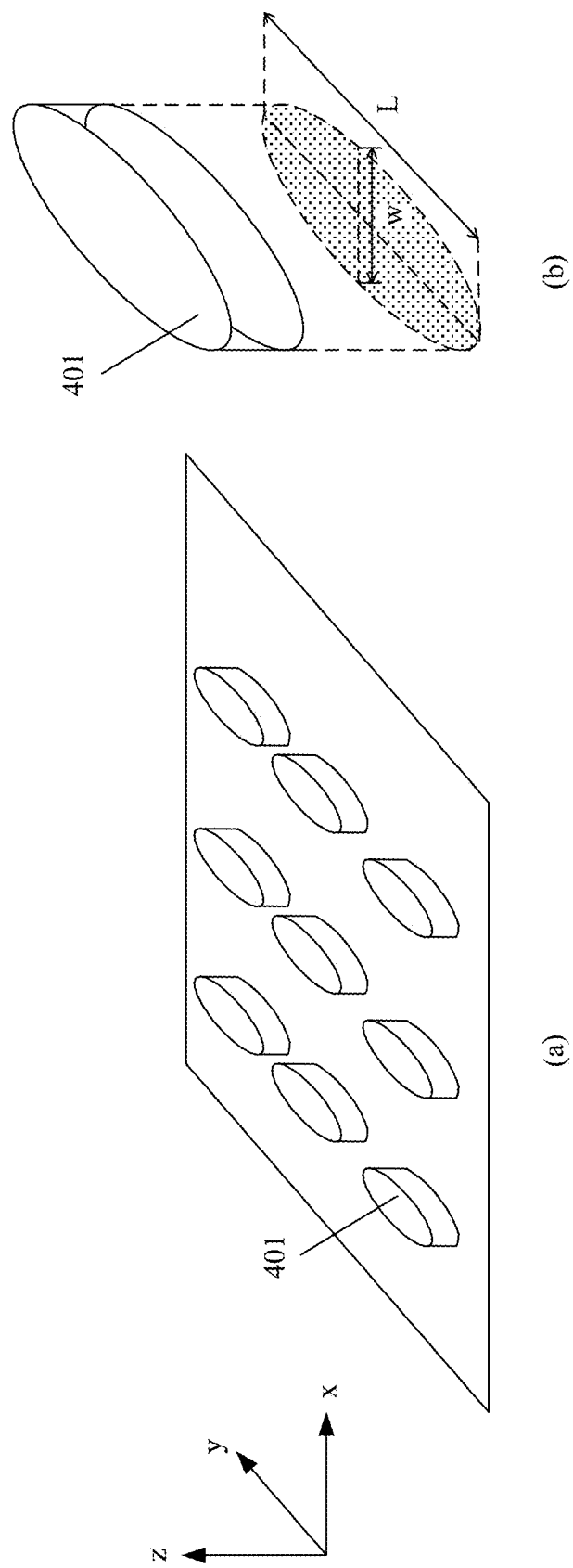
FIG. 4 is a schematic diagram of an alignment unit structure applicable to an embodiment of this application.

The alignment unit structure may alternatively be an elliptic cylinder 401 shown in FIG. 4. As shown in FIG. 4, a first surface of the elliptic cylinder 401 is a surface that faces away from a liquid crystal layer. For example, the first surface may be a bottom surface of the elliptic cylinder 401. As shown in (b) in FIG. 4, a ratio L/W of a major axis of the bottom surface of the elliptic cylinder 401 to a minor axis of the bottom surface of the elliptic cylinder 401 is greater than 1.

Figure 5:
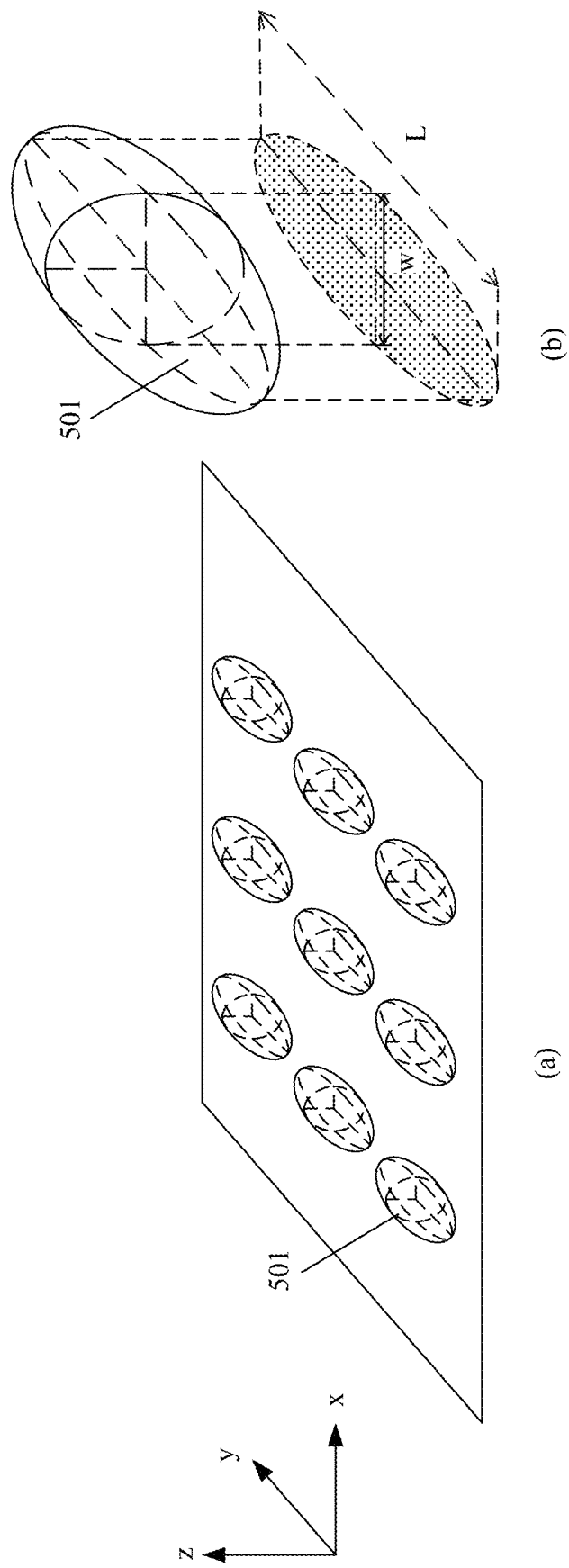
FIG. 5 is a schematic diagram of an alignment unit structure applicable to an embodiment of this application.

In addition to the several cases shown in FIG. 2 to FIG. 4, the alignment unit structure may alternatively be another structure in an irregular shape. When a length-width ratio of the alignment unit structure on a projection plane of the alignment unit structure is greater than 1, alignment may also be implemented on the liquid crystal molecules at a liquid crystal layer. For example, a unit structure at the metamaterial layer 104 may be an ellipsoid 501 shown in FIG. 5. As shown in (b) in FIG. 5, a first surface of the ellipsoid 501 may be a projection plane on a surface that is of the ellipsoid and that faces away from a liquid crystal layer. A ratio L/W of a major axis of the projection plane of the ellipsoid 501 to a minor axis of the projection plane of the ellipsoid 501 is greater than 1. In addition to the ellipsoid shown in FIG. 5, the alignment unit structure may alternatively be another structure in an irregular shape, for example, a spindle-shaped structure, a dumbbell-shaped structure, or a football-shaped structure. This is not limited in this application.

It should be understood that a material of the alignment unit structure may be a low-loss dielectric material, for example, silicon dioxide ($SiO_2$), titanium dioxide ($TiO_2$), silicon nitride (SiNx), aluminum oxide ($Al_2O_3$), silicon (Si), or the like. A material of the alignment unit structure may alternatively be a metal material, for example, gold (Au), silver (Ag), aluminum (Al), copper (Cu), or platinum (Pt). This is not limited in this application.

Figure 6:
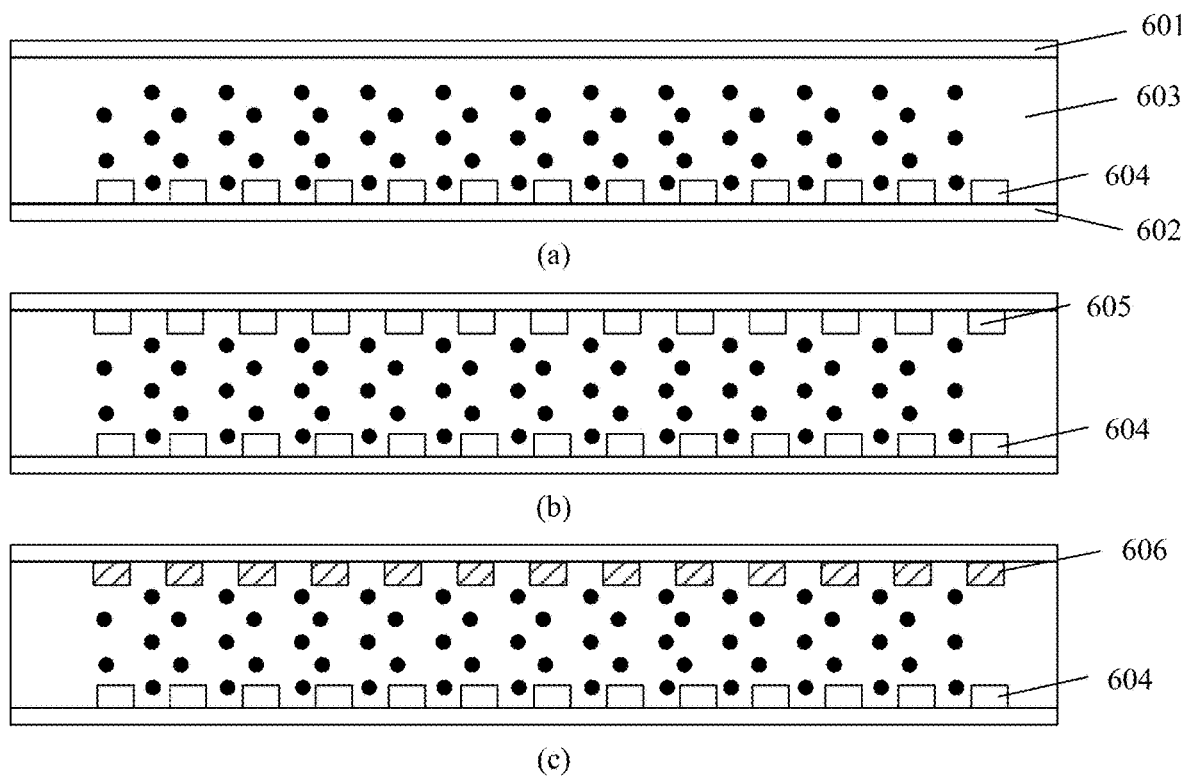
FIG. 6 is a schematic diagram of a structure of an electromagnetic wave control apparatus applicable to an embodiment of this application.

The electromagnetic wave control apparatus in this embodiment of this application may alternatively use three arrangement manners shown in FIG. 6.

A possible apparatus structure is shown in (a) in FIG. 6, and includes an upper electrode layer 601, a lower electrode layer 602, and a liquid crystal layer 603 and a first metamaterial layer 604 that are disposed between the upper electrode layer 601 and the lower electrode layer 602. The metamaterial layer 604 may be located on a lower surface of the liquid crystal layer 603, for example, disposed on a surface of the lower electrode layer 602. It should be understood that the first metamaterial layer 604 includes a first array including alignment unit structures. The alignment unit structure may be any structure shown in FIG. 2 to FIG. 5.

Another possible apparatus structure is shown in (b) in FIG. 6, and includes the upper electrode layer 601, the lower electrode layer 602, the liquid crystal layer 603, the first metamaterial layer 604, and a second metamaterial layer 605. The first metamaterial layer 604 is located on the lower surface of the liquid crystal layer. The second metamaterial layer 605 is located on an upper surface of the liquid crystal layer, for example, the second metamaterial layer 605 is disposed on a surface of the upper electrode layer 601.

Another possible apparatus structure is shown in (c) in FIG. 6, and includes the upper electrode layer 601, the lower electrode layer 602, the liquid crystal layer 603, the first metamaterial layer 604, and a polyimide (PI) frictional layer 606. The first metamaterial layer 604 is located on a lower surface of the liquid crystal layer. The PI frictional layer 606 is located on the upper surface of the liquid crystal layer 603, for example, disposed on the surface of the upper electrode layer 601. Optionally, in the apparatus shown in (c) in FIG. 6, the PI frictional layer 606 may alternatively be located on the lower surface of the liquid crystal layer 603. The first metamaterial layer 604 may be located on the upper surface of the liquid crystal layer.

Figure 7:
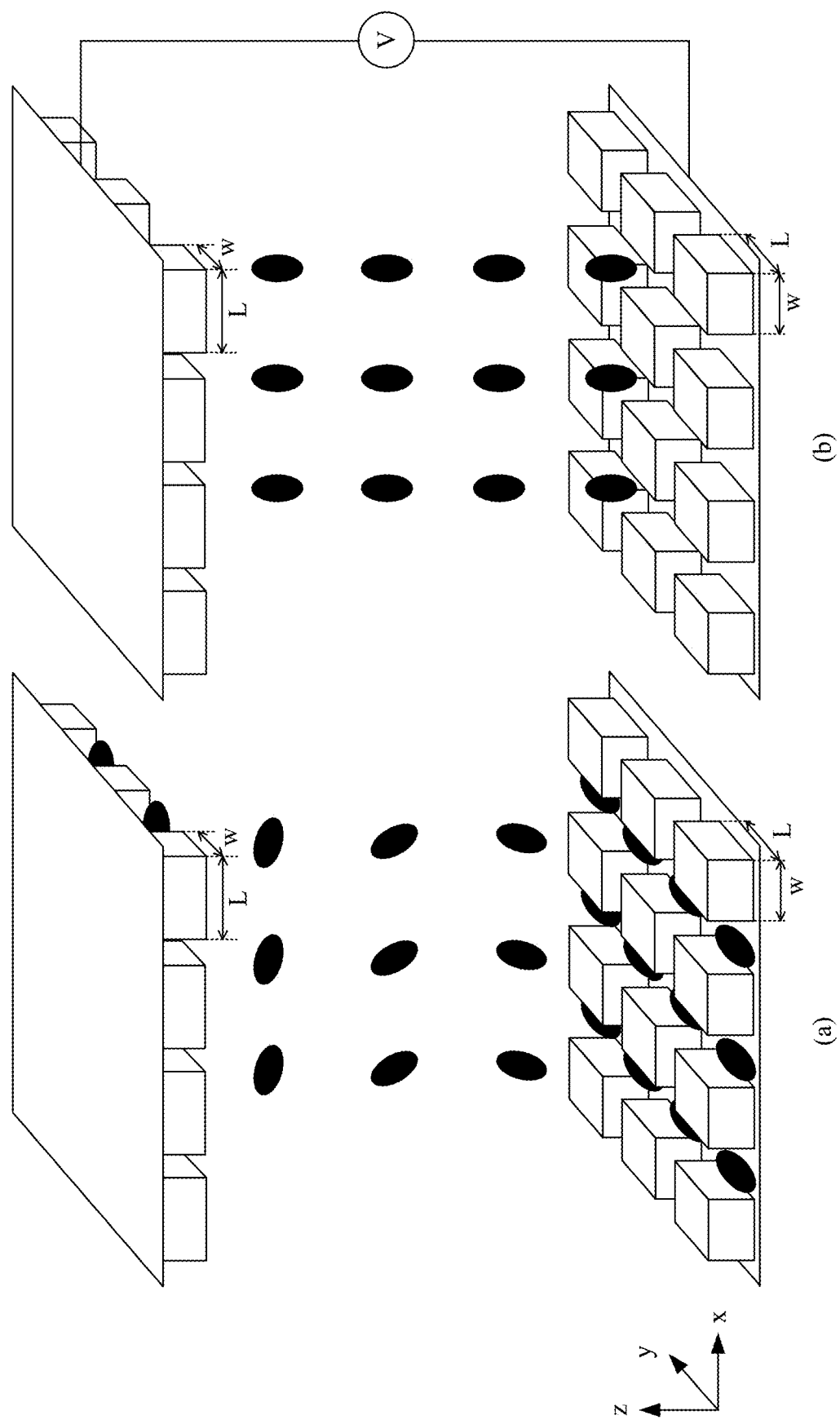
FIG. 7 is a schematic diagram of a structure of an electromagnetic wave control apparatus applicable to an embodiment of this application.

It should be further noted that, in the electromagnetic wave control apparatus shown in (b) in FIG. 6, an alignment direction of the first metamaterial layer 604 and an alignment direction of the second metamaterial layer 605 may be parallel to each other. Optionally, there may alternatively be a specific included angle, for example, 45°, between the alignment direction of the metamaterial layer 605 and the alignment direction of the metamaterial layer 604. Optionally, the alignment direction of the metamaterial layer 605 and the alignment direction of the metamaterial layer 604 may be perpendicular to each other. As shown in (a) in FIG. 7, the first metamaterial layer 604 disposed on the surface of the lower electrode layer includes the first array including alignment unit structures. The second metamaterial layer 605 disposed on the upper electrode layer includes a second array including alignment unit structures. An alignment direction of the first array is perpendicular to an alignment direction of the second array. Liquid crystal molecules between the upper electrode layer and the lower electrode layer tend to be arranged in parallel due to action of van der Waals force. However, because the alignment direction of the metamaterial layer 605 for the liquid crystal molecules is perpendicular to the alignment direction the metamaterial layer 604 for the liquid crystal molecules, an arrangement direction of liquid crystal molecules near the upper electrode is perpendicular to an arrangement direction of liquid crystal molecules near the lower electrode. In this case, the liquid crystal molecules are arranged in a direction of 0° (an included angle between the upper electrode layer and an x-axis direction) from the upper electrode layer, and are gradually and uniformly twisted to the lower electrode in a direction of −90°, for example, the liquid crystal molecules are twisted by 90° one by one clockwise. A layer of the liquid crystal molecules that are twisted in an arrangement manner shown in (a) in FIG. 7 has a property of an optical waveguide. When linearly polarized light in a polarization direction parallel to the x-axis direction is propagated to the surface of the lower electrode layer through the liquid crystal layer, the polarization direction is rotated by 90°. (b) in FIG. 7 is a schematic diagram of arrangement of the liquid crystal molecules when a drive voltage is applied. In this case, the liquid crystal molecules tend to be arranged parallel to a direction of an electric field, that is, a major axis direction of the liquid crystal molecules is perpendicular to an xy plane. In this case, the liquid crystal molecules cannot adjust and control a polarization direction of an incident light beam.

Therefore, for the electromagnetic wave control apparatus in this embodiment of this application, two metamaterial layers whose alignment directions are perpendicular are respectively disposed on the upper electrode layer and the lower electrode layer, so that a polarization direction of a linearly polarized electromagnetic wave is twisted by about 90° after the linearly polarized electromagnetic wave is transmitted by the apparatus. A special optical waveguide feature of the liquid crystal molecules in the apparatus may be used to manufacture a liquid crystal device with a better extinction ratio.

Similar to the structure in (b) in FIG. 6, the alignment direction of the first metamaterial layer 604 may also be parallel or perpendicular to, or form a specific included angle with an alignment direction of the PI frictional layer 606 in (c) in FIG. 6. In addition, the liquid crystal molecules may implement an optical waveguide feature similar to the optical waveguide feature shown in (a) in FIG. 7, to further construct a liquid crystal device with a better extinction ratio.

In addition to the several structures shown in FIG. 6, the alignment apparatus may alternatively use another similar arrangement manner. This is not limited in this application. For example, in (b) in FIG. 6, the first metamaterial layer 604 and the second metamaterial layer 605 may use different alignment unit structures.

In an optional implementation, in the electromagnetic wave control apparatus in this embodiment of this application, the first metamaterial layer may alternatively include both the first array including alignment unit structures and a third array including alignment unit structures, and an alignment direction of the third array is perpendicular to the alignment direction of the first array. Two arrays whose alignment directions are perpendicular to each other are reused, to implement alignment on liquid crystal molecules in two directions at a same metamaterial layer.

Similarly, the first metamaterial layer may further include a fourth array in another alignment direction. The first metamaterial layer may further include arrays in several alignment directions at the same time, and each array may use a different alignment unit structure. This is not limited in this embodiment of this application.

Therefore, the electromagnetic wave control apparatus in this embodiment of this application, two arrays whose alignment directions are perpendicular can be reused, to implement alignment on the liquid crystal molecules in two different directions at a same metamaterial layer. In comparison with conventional friction alignment and optical alignment technologies, the alignment direction of the liquid crystal molecules can be flexibly controlled, and integration of the liquid crystal device can be implemented.

Figure 8:
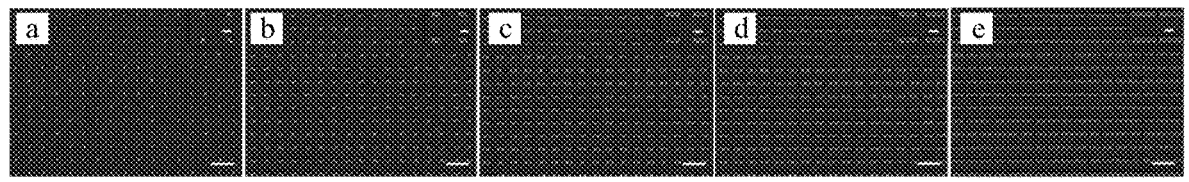
FIG. 8 is an electron micrograph diagram of an alignment unit structure applicable to an embodiment of this application.
Figure 9:
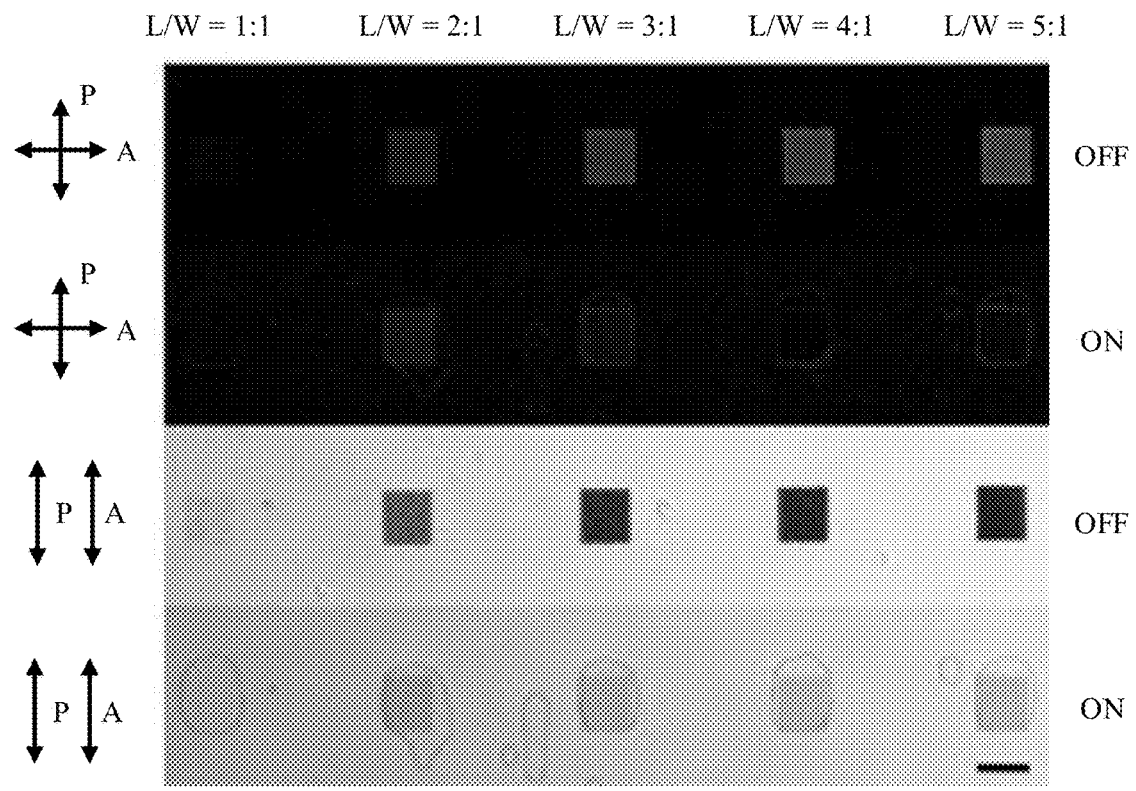
FIG. 9 is a diagram of liquid crystal alignment effect of an electromagnetic wave control apparatus under a polarization microscope applicable to an embodiment of this application.

The following uses the apparatus 100 in FIG. 1 as an example to describe an experimental result of the electromagnetic wave control apparatus in this embodiment of this application. A unit structure used in an experiment is a rectangular column structure and a material is gold. FIG. 8 is an electron microscopic diagram of a structure of a unit structure with a length-width ratio L/W of 1:1, 2:1, 3:1, 4:1, or 5:1. FIG. 9 shows an experiment result of alignment effect of unit structures with five length-width ratios on liquid crystal molecules. Two polarizers P1 and P2 are respectively placed on an upper surface of an upper cover plate 106 of the apparatus 100 and a lower surface of a substrate layer 101 of the apparatus 100. The polarizer P1 on the upper cover plate 106 is in a polarization direction P. After natural light from a light source passes through the polarizer, only linearly polarized light parallel to the polarization direction P is left. Polarization direction of the polarizer P2 on the lower surface of the substrate layer 101 is A. Only linearly polarized light whose polarization direction is parallel to A can be totally transmitted by P2. Linearly polarized light in another polarization direction may be partially transmitted by P2. Linearly polarized light whose polarization direction is perpendicular to A cannot be transmitted by P2. After the natural light from the light source passes through P1 and P2, if A is perpendicular to P, a light beam cannot be transmitted by P2, and P2 cannot transmit light. If A is parallel to P, a light beam may be transmitted by P2, and P2 totally transmits light. FIG. 9 is a diagram of alignment effect of the apparatus 100 on liquid crystal molecules when A is perpendicular to P and when A is parallel to P. Under a polarization microscope, alignment effect in a power-off state (OFF) is compared with alignment effect in a power-on state (ON).

As shown in FIG. 9, when P is perpendicular to A, power is turned off, and weak light is transmitted by P2. This indicates that the liquid crystal molecules change a polarization direction of the light beam. When the power is turned on, the liquid crystal molecules are arranged in a direction of an electric field, a polarization direction of the light beam cannot be adjusted and controlled, and light-transmitting phenomenon disappears. A larger length-width ratio of a rectangular column indicates more obvious contrast of the light-transmitting phenomenon. The experiment result shows that an array including unit structures may implement alignment on the liquid crystal molecules. Similarly, when P is parallel to A, power is turned off, the light beam cannot be totally transmitted by P2, and an extinction phenomenon exists. This indicates that the liquid crystal molecules change a polarization direction of the light beam. When the power is turned on, the liquid crystal molecules are arranged in a direction of an electric field, the polarization direction of the light beam cannot be adjusted and controlled, and an extinction phenomenon disappears. A larger length-width ratio of a rectangular column indicates more obvious contrast of the extinction phenomenon. It is also shown that an array including unit structures may implement alignment on the liquid crystal molecules. In addition, the larger length-width ratio L/W of the unit structure indicates better alignment effect on the liquid crystal molecules. To implement a better alignment result, the length-width ratio L/W of the unit structure may be greater than or equal to 5.

To further optimize an adjustment and control function of the apparatus 100 on an incident light beam, in the apparatus 100 shown in FIG. 1, a spacer layer 103 may be added to optimize device efficiency. A material of the spacer layer 103 may be a material with a low loss and a low refractive index, for example, $SiO_2$. Alternatively, the apparatus 100 may not include the spacer layer 103. This is not limited in this application.

It should be understood that the electromagnetic wave control apparatus in this embodiment of this application may be used in a structure such as a projection display liquid crystal on silicon (LCOS) module and a wavelength-selective switch (WSS). Further, the electromagnetic wave control apparatus in this embodiment of this application may be a spatial light modulator (SLM), and may perform time or space conversion or modulation on a feature such as a phase, an amplitude, and an intensity of an optical wave under control of a control signal. The control signal may be an optical signal or an electrical signal. The spatial light modulator may alternatively include a plurality of independent units, and the independent units are spatially arranged in a one-dimensional or two-dimensional array. Each unit may independently receive the control of the control signal and change an optical property of each unit based on the signal, to modulate the incident light beam.

Figure 10:
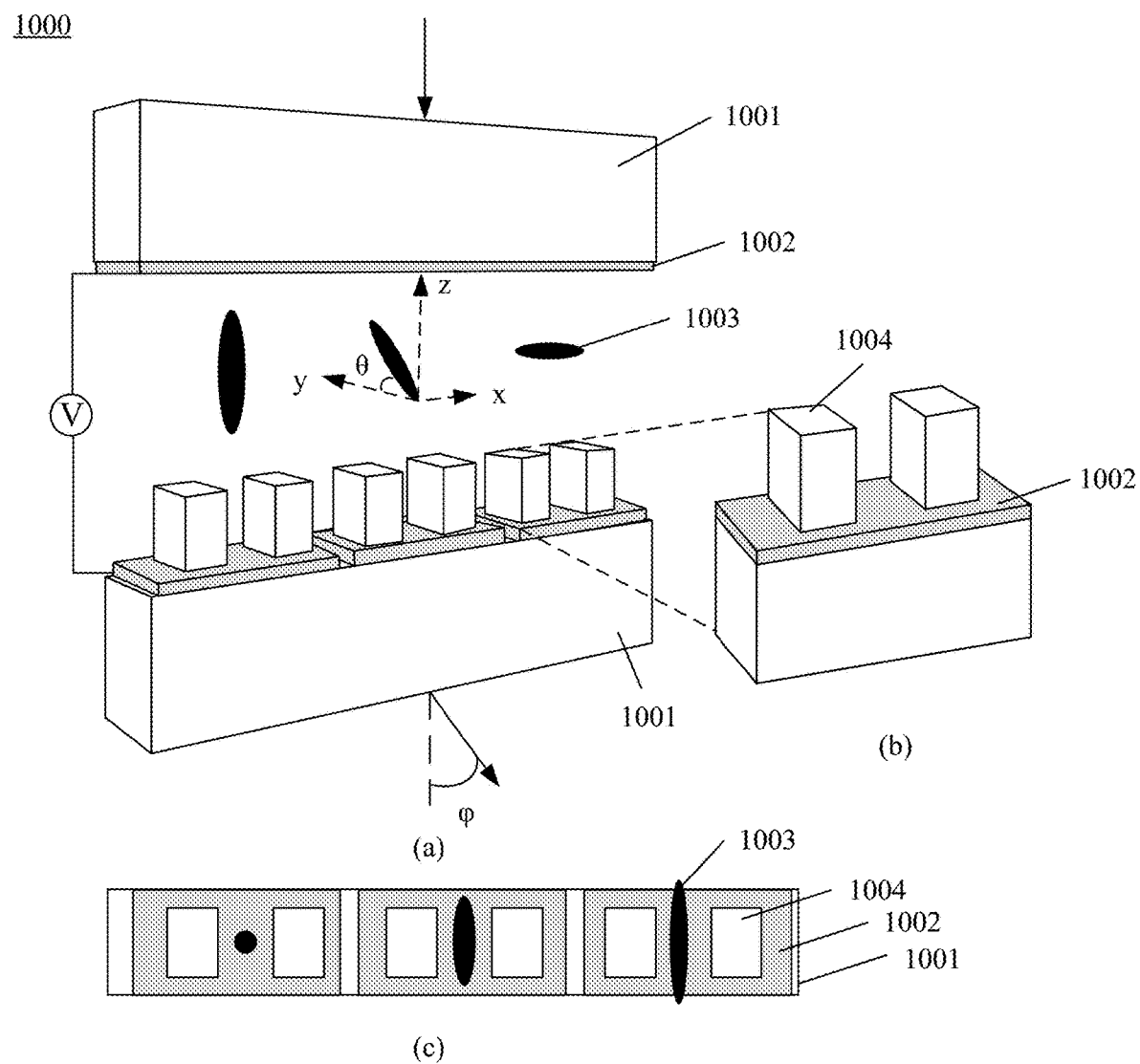
FIG. 10 is a schematic diagram of a structure of a transmissive spatial light modulator applicable to an embodiment of this application.

FIG. 10 is a diagram of a structure of a transmissive spatial light modulator applicable to an embodiment of this application. As shown in (a) in FIG. 10, a spatial light modulator structure 1000 is a polarization-dependent phase transmissive spatial light modulator based on a metasurface, and includes an upper glass layer 1001 and a lower glass layer 1001. The upper glass layer 1001 and the lower glass layer 1001 each are plated with an ITO electrode, to form an external circuit 1002. A matrix control layer is disposed between the upper glass layer 1001 and the lower glass layer 1001, and includes a metamaterial layer and a liquid crystal layer. The metamaterial layer may include an alignment unit structure 1004 similar to the metamaterial layer 104 in (a) in FIG. 1. Liquid crystal molecules 1003 at the liquid crystal layer are arranged in a major axis direction (namely, a y-axis direction) of the alignment unit structure 1004. A spacer layer may alternatively be added between a lower electrode and the alignment unit structure 1004, to improve efficiency of the structure.

It should be understood that FIG. 10 merely shows a possible example of a transmissive spatial light modulator structure. The metamaterial layer may include any array including alignment unit structures in FIG. 2 to FIG. 5. This is not limited in this application. In addition, the transmissive spatial light modulator structure 1000 may use any arrangement manner shown in FIG. 6. This is not limited in this application.

By changing an external applied voltage, the liquid crystal molecules 1003 in the spatial light modulator structure may rotate at different angles on a yz plane, to change an equivalent refractive index of the liquid crystal layer in various directions. Therefore, a spatial light modulator generates different electromagnetic responses to an incident light beam, to implement adjustment and control on the incident light beam.

As shown in (a) in FIG. 10, there is a spacing between lower electrodes. Therefore, the matrix control layer may be divided into a plurality of adjustment and control matrix units. Independent voltage control may be implemented between the adjustment and control matrix units. (b) in FIG. 10 is a schematic diagram of one adjustment and control matrix unit. Each adjustment and control matrix unit may include at least one rectangular nanopillar. (c) in FIG. 10 is atop view of three adjustment and control matrix units shown in (a) in FIG. 10. Different voltages are applied to each adjustment and control matrix unit, to control the liquid crystal molecules 1003 to present different rotation angles. Therefore, different adjustment and control matrix units have different phase adjustment and control effect on incident light with a same wavelength. With a phase delay generated at the metamaterial layer, the spatial light modulator structure 1000 may implement phase adjustment and control on incident light and implement adjustment and control on an emergent angle of the incident light.

In the spatial light modulator structure 1000, a thickness of the matrix control layer between the upper and lower electrodes 1002 is 1.5 μm. A length of an electrode on each adjustment and control matrix unit in an x-axis direction is 690 nm, and a width in the y-axis direction is 345 nm. Each $TiO_2$ rectangular nanopillar is 250 nm high in a z-axis direction, 225 nm long in the y-axis direction, and 150 nm wide in the x-axis direction. The alignment unit structure 904 is a $TiO_2$ rectangular nanopillar. Each adjustment and control matrix unit includes two $TiO_2$ rectangular nanopillars.

In (a) in FIG. 10, a combination of three adjustment and control matrix units is respectively shown. In the three adjustment and control matrix units, included angles $\theta_{LC}$ between the liquid crystal molecules and a y axis are 90°, 45° and 0° from left to right. Emergent light passing through the spatial light modulator is deflected to the right. The three adjustment and control matrix units with $\theta_{LC}$ of 90°, 45°, and 0° may be considered as a periodic structure. In one periodic structure, a rotation angle of the liquid crystal molecules in adjacent adjustment and control matrix units changes violently, and a maximum deflection angle φ of the emergent light may be 11.7°. Similarly, if the rotation angles $\theta_{LC}$ of the liquid crystal molecules are adjusted and controlled to be 0°, 45°, and 90° from left to right, the emergent light is deflected to the left, and a maximum deflection angle is −11.7°. Therefore, the structure can adjust and control a deflection angle of the emergent light in a range of ±11.7°.

It should be understood that materials related to the spatial light modulator structure 1000 are dielectric materials, and almost no incident light is absorbed in a range of 600 nm to 700 nm. A $TiO_2$ material used in the alignment unit structure 1004 may alternatively be replaced by another material with a high refractive index without ohmic losses, and a same function may be implemented provided that a geometric structure of the rectangular nanopillar is adjusted and the periodic structure of an adjustment and control matrix unit is adjusted and controlled.

Figure 11:
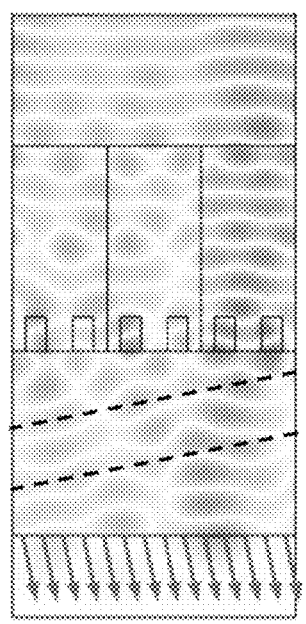
FIG. 11 is a schematic diagram of an electromagnetic wave transmittance of a transmissive spatial light modulator applicable to an embodiment of this application.
Figure 11:
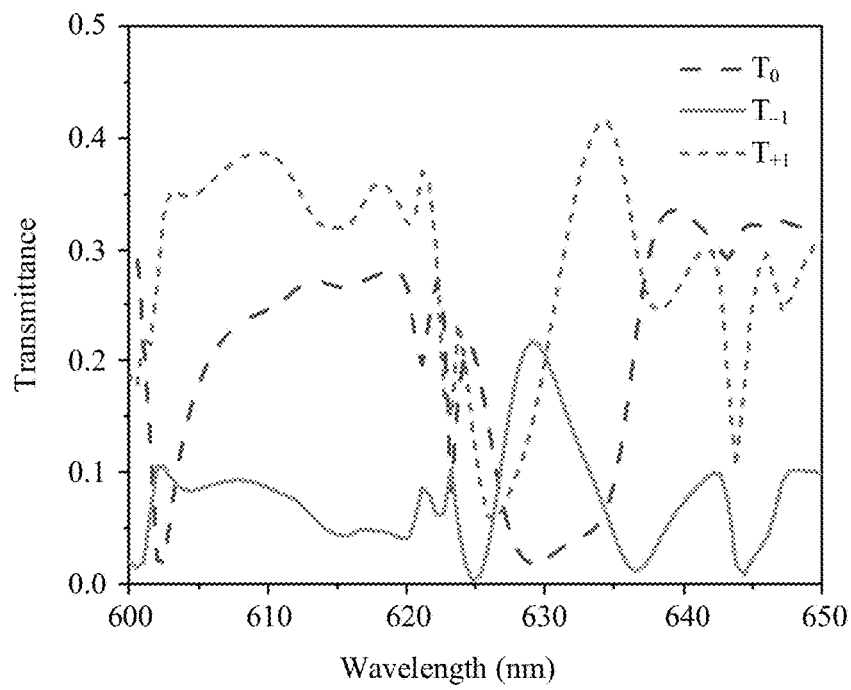

(a) in FIG. 11 is a distribution diagram of a component $E_y$ of an electric field on an xz plane in a periodic structure including liquid crystal control units whose $\theta_{LC}$ are 0°, 45°, and 90° from left to right. A dashed line in (a) in FIG. 11 is an equipotential line of electric field distribution, and a direction indicated by an arrow is a polarization direction of the emergent light after the emergent light passes through the liquid crystal layer. (b) in FIG. 11 is a diagram of transmittances corresponding to different diffraction orders of a spatial light modulator 900. The incident light is a transverse electric wave (TE wave). When the incident light passes through the liquid crystal control units whose $\theta_{LC}$ are 0°, 45°, and 90°, a transmittance of +1-order diffractive light of the incident light may reach 0.43, and is better than a transmittance of the phase transmissive spatial light modulator of another structure in the conventional technology.

The rectangular nanopillar unit structure 1004 enables the liquid crystal molecules to have better alignment effect. When there is no voltage, the liquid crystal molecules are arranged in a major axis direction of a rectangular nanopillar, namely, a y-axis direction.

Figure 12:
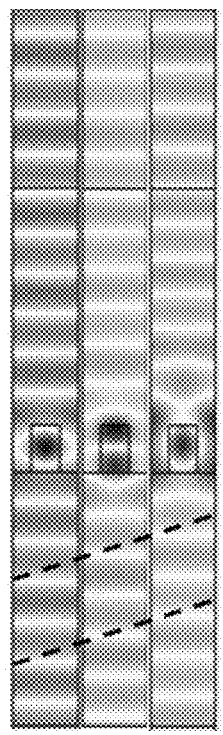
FIG. 12 is a schematic diagram of phase adjustment and control performed by a transmissive spatial light modulator on an electromagnetic wave applicable to an embodiment of this application.
Figure 12:
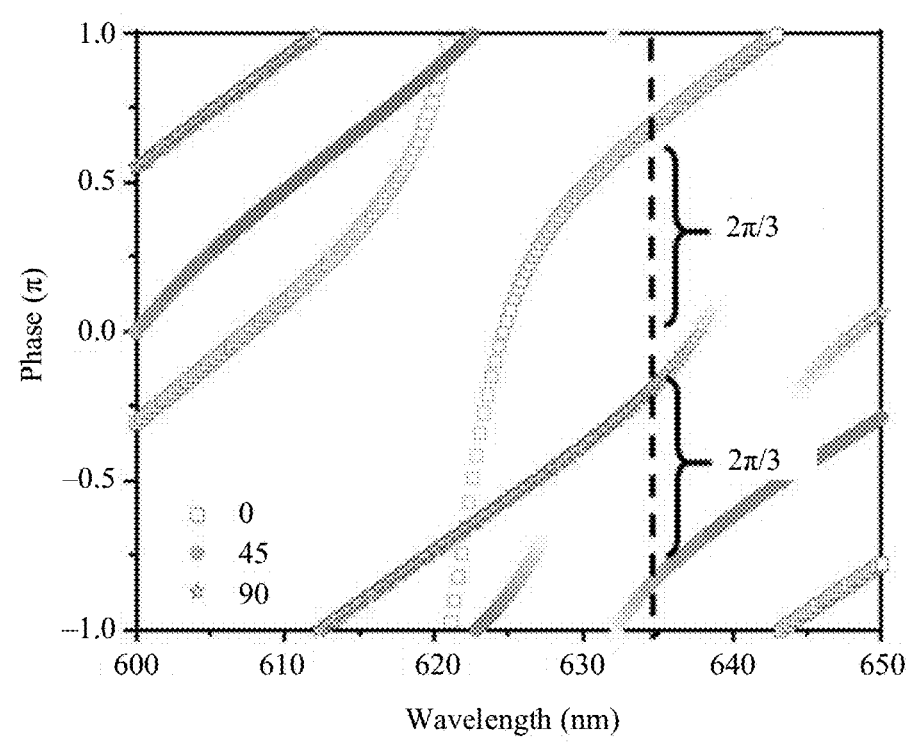

(a) in FIG. 12 is a distribution diagram of a component $E_y$ of an electric field on an xz plane in a periodic structure including liquid crystal control units whose $\theta_{LC}$ are 90°, 45°, and 0° from left to right. (b) in FIG. 12 shows a phase change of incident light (TE wave) with different wavelengths when the incident light passes through the periodic structure. As shown in (b) in FIG. 12, a dashed line in the figure indicates a phase change of emergent light when an incident wavelength is 634 nm. When $\theta_{LC}=0°$, liquid crystal molecules are arranged in a major axis direction of a rectangular nanopillar, and the phase change of the emergent light is the largest. Therefore, when the polarization direction of the incident light is in the major axis direction of the rectangular nanopillar, the spatial light modulator has good phase adjustment and control effect on the emergent light. When $\theta_{LC}=90°$, liquid crystal molecules are arranged in a direction perpendicular to a major axis direction of a rectangular nanopillar, for example, arranged in a z axis direction, and the phase change of the emergent light is small. Therefore, when the polarization direction of the incident light is perpendicular to the major axis direction of the rectangular nanopillar, the spatial light modulator has weak phase adjustment and control effect on the emergent light.

Therefore, for the transmissive spatial light modulator in this embodiment of this application, the liquid crystal molecules are aligned based on the metamaterial layer that includes the alignment unit structure. In addition, a phase delay accumulated at the metamaterial layer may be used, to generate deep phase modulation in the spatial light modulator, or reduce the thickness of the liquid crystal layer. By changing an external applied voltage to control the rotation angle of the liquid crystal molecules, an emergent direction and a phase of a transmitted beam may be adjusted and controlled. Compared with another type of liquid crystal spatial light modulator, the transmissive spatial light modulator based on the metamaterial layer has a simple structure, is easier to prepare, and optimizes a structure of the liquid crystal spatial light modulator.

Figure 13:
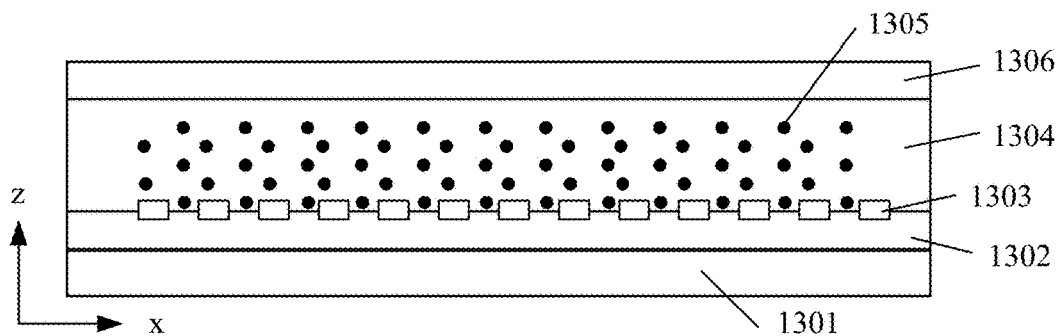
FIG. 13 is a schematic diagram of a structure of a reflective spatial light modulator applicable to an embodiment of this application.
Figure 13:
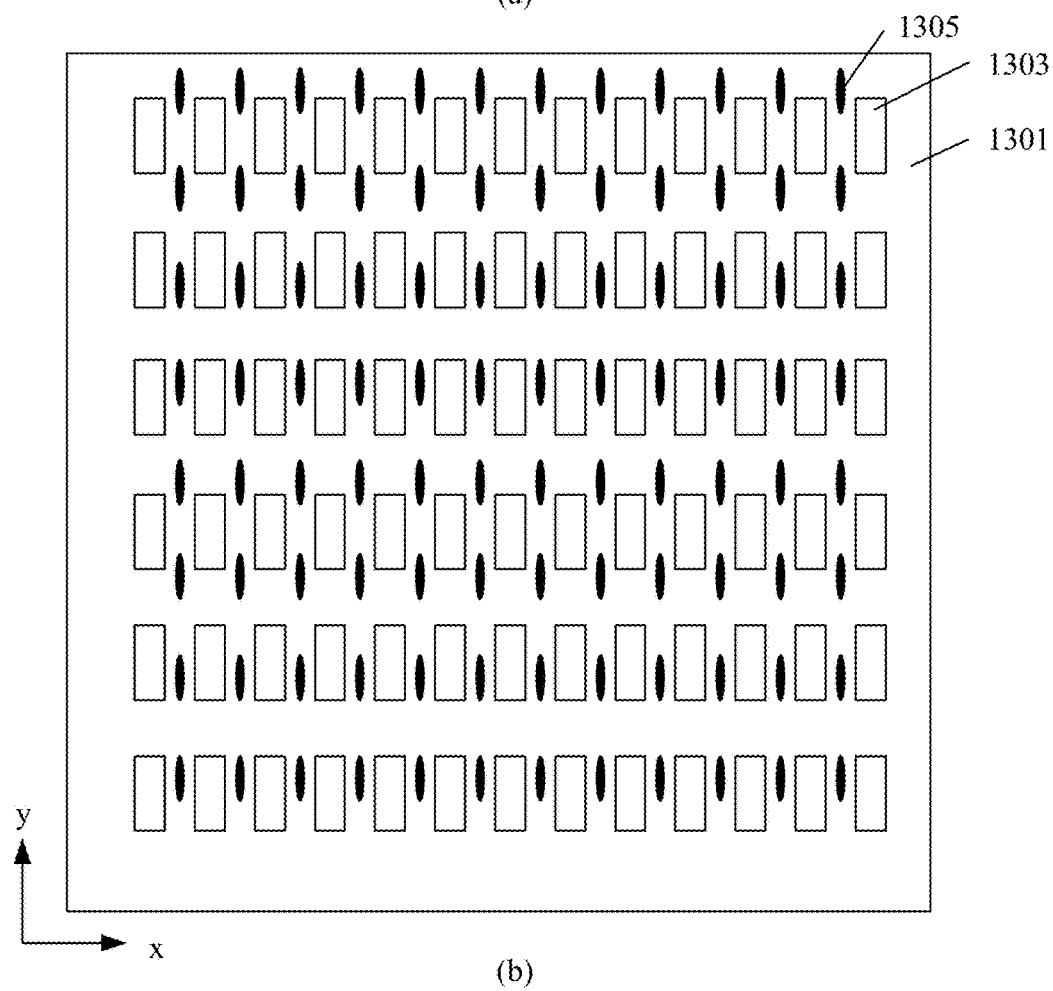

FIG. 13 is a diagram of a structure of another reflective spatial light modulator applicable to an embodiment of this application. (a) in FIG. 13 is a side sectional view of the reflective spatial light modulator structure. As shown in (a) in FIG. 13, a spatial light modulator structure 1300 is a polarization-dependent phase-reflective spatial light modulator based on a metamaterial layer, and includes an upper cover plate 1306, a liquid crystal layer 1304, liquid crystal molecules 1305, a metamaterial layer 1303, a spacer layer 1302, and a liquid crystal on silicon (LCoS) drive backplane 1301. The upper cover plate 1306 includes an electrode. The electrode may be a conductive layer made of a material such as ITO or zinc oxide (ZnO).

It should be understood that FIG. 13 merely shows a possible example of the reflective spatial light modulator structure. The metamaterial layer may include an array including alignment unit structures in FIG. 2 to FIG. 5. This is not limited in this application. In addition, the transmissive spatial light modulator structure 1300 may use any arrangement manner shown in FIG. 6. This is not limited in this application.

Similar to the structure of the spatial light modulator 1000 in FIG. 10, the LCoS drive backplane may apply voltages of different sizes to the liquid crystal layer 1304, so that the liquid crystal molecules are arranged at different rotation angles. Therefore, a response of the spatial light modulator structure to incident light with a same wavelength changes, to achieve a purpose of adjusting and controlling a phase of emergent light.

(b) in FIG. 13 shows a partial top view of the metamaterial layer 1303 of the spatial light modulator structure 1300. On the metamaterial layer 1303, the unit structure is a neatly arranged rectangular column. In addition, a length-width ratio of the rectangular column is greater than 1, that is, the rectangular column is longer in a y-axis direction and shorter in an x-axis direction. The rectangular column unit structure forms a micro "groove" on a lower surface of the liquid crystal layer. Under joint action of van der Waals force, the liquid crystal molecules at the liquid crystal layer 1304 are arranged in a major axis direction of the rectangular column, that is, arranged in the y-axis direction. Therefore, the metamaterial layer 1303 may implement a liquid crystal alignment function in the spatial light modulator 1300. When a drive voltage is applied, the major axis direction of the liquid crystal molecules rotates around an x-axis until the major axis direction of the liquid crystal molecules is perpendicular to an xy plane. Similar to the spatial light modulator 1000 in FIG. 10, when a polarization direction of the incident light is in the major axis direction (namely, the y-axis direction) of the rectangular nanopillar, the spatial light modulator has good phase adjustment and control effect on the emergent light.

Therefore, for the reflective spatial light modulator in this embodiment of this application, the liquid crystal molecules are aligned based on the metamaterial layer that includes the alignment unit structure. By changing an external applied voltage to control the rotation angle of the liquid crystal molecules, an emergent direction and a phase of a beam may be adjusted and controlled. In addition, deep phase modulation may be generated in the spatial light modulator by using a phase delay accumulated at the metamaterial layer or reducing a thickness of the liquid crystal layer. By changing the external applied voltage to control the rotation angle of the liquid crystal molecules, an emergent direction and a phase of a transmitted beam may be adjusted and controlled. Compared with another type of liquid crystal spatial light modulator, the transmissive spatial light modulator based on the metamaterial layer has a simple structure, is easier to prepare, and optimizes a structure of the liquid crystal spatial light modulator.

Figure 14:
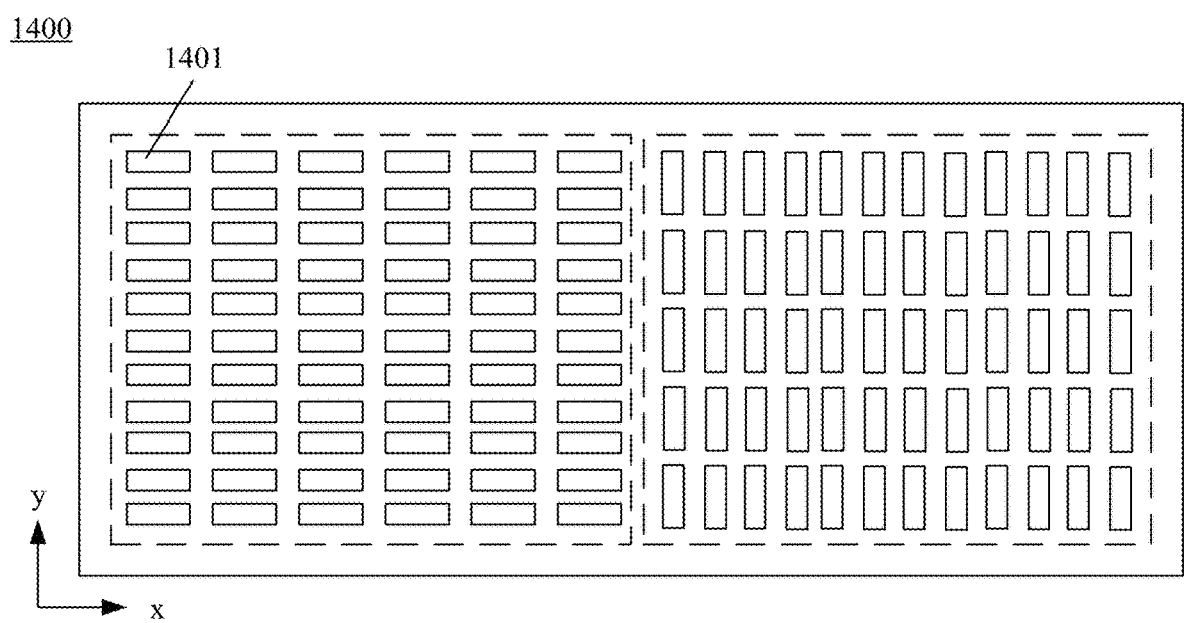
FIG. 14 is a schematic diagram of a reusable and adjustable metasurface structure applicable to an embodiment of this application.

FIG. 14 shows a reusable and adjustable metasurface structure 1400 applicable to an embodiment of this application. FIG. 14 is a partial top view of a metasurface. Arrays including two alignment unit structures 1401 whose alignment directions are perpendicular are respectively arranged at substrate layers on left and right sides. At a left substrate layer, a major axis direction of a rectangular column is parallel to an x-axis, and liquid crystal molecules are arranged in parallel in an x-axis direction. On a right substrate layer, the major axis direction of the rectangular column is parallel to a y-axis, and the liquid crystal molecules are arranged in parallel in a y-axis direction. Under action of the liquid crystal molecules in two alignment directions, a polarization direction of a light beam incident to the left side of the substrate layer is deflected in a direction parallel to the x-axis direction, and a polarization direction of a light beam incident to the right side of the substrate layer is deflected in a direction parallel to the y-axis direction. At the same time, the metasurface may also implement phase modulation of an incident light beam.

Therefore, for the metasurface structure in this embodiment of this application, dual-polarization direction modulation may be implemented on a same chip, and phase modulation of a light beam can be further implemented. The metasurface structure cooperates with a polarization beam splitter, to reduce a polarization conversion element and implement better integration.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electromagnetic wave control apparatus, comprising:
   an upper electrode layer;
   a lower electrode layer;
   a liquid crystal layer;
   a first metamaterial layer located on a lower surface of the liquid crystal layer, the first metamaterial layer comprising a first array comprising first alignment unit structures and a third array comprising third alignment unit structures, wherein an alignment direction of the third array is perpendicular to the alignment direction of the first array;
   a polyimide frictional layer located on an upper surface of the liquid crystal layer, an alignment direction of the polyimide frictional layer being perpendicular to an alignment direction of the first array;
   a first voltage source configured to supply a first voltage to the first alignment unit structures; and
   a third voltage source configured to supply a third voltage to the third alignment unit structures, wherein the liquid crystal layer and the first metamaterial layer are disposed between the upper electrode layer and the lower electrode layer, and wherein the first voltage source and the third voltage source are configured to supply different voltages to the first alignment unit structure and to the third alignment unit structure.

2. The apparatus according to claim 1, wherein the length of the first surface, the width of the first surface, and the spacing are in a range of $\lambda/100$ to $\lambda$, wherein $\lambda$ is a wavelength of an electromagnetic wave incident on the first metamaterial layer, and wherein $\lambda$ is in a range of from 100 nm to 2000 nm.

3. An electromagnetic wave control apparatus, comprising:

an upper electrode layer;

a lower electrode layer;

a liquid crystal layer;

a first metamaterial layer located on a lower surface of the liquid crystal layer, the first metamaterial layer comprising a first array comprising first alignment unit structures and a third array comprising third alignment unit structures;

a second metamaterial layer located on an upper surface of the liquid crystal layer, the second metamaterial layer comprising a second array comprising second alignment unit structures;

a first voltage source configured to supply a first voltage to the first alignment unit structures; and a third voltage source configured to supply a third voltage to the third alignment unit structures, wherein the first alignment unit structures and the third alignment unit structures are configured to implement, at a single metamaterial layer, alignment on liquid crystal molecules in the liquid crystal layer in two different directions, wherein the liquid crystal layer and the first metamaterial layer are disposed between the upper electrode layer and the lower electrode layer, and wherein the first voltage source and the third voltage source are configured to supply different voltages to the first alignment unit structure and to the third alignment unit structure.

4. The apparatus according to claim 3, wherein an alignment direction of the second array is perpendicular to an alignment direction of the first array.

5. The apparatus according to claim 3, wherein an alignment direction of the second array is parallel to an alignment direction of the first array.

6. The apparatus according to claim 1, wherein the apparatus further comprises:

a spacer layer, wherein the first metamaterial layer is disposed on a surface of the spacer layer.

7. The apparatus according to claim 1, wherein the alignment unit structure is a rectangular column.

8. The apparatus according to claim 1, wherein the alignment unit structure is a wedge-shaped column.

9. The apparatus according to claim 1, wherein the alignment unit structure is a triangular prism, the first surface is a side surface of the triangular prism, and a ratio of a height of the triangular prism to a side length of a bottom triangle is greater than 1.

10. The apparatus according to claim 1, wherein the alignment unit structure is an elliptical column, the first surface is a bottom surface of the elliptical column, and a ratio of a major axis of the bottom surface of the elliptical column to a minor axis of the bottom surface of the elliptical column is greater than 1.

11. The apparatus according to claim 1, wherein the alignment unit structure is an ellipsoid, the first surface is a projection plane of the ellipsoid, and a ratio of a major axis of the projection plane of the ellipsoid to a minor axis of the projection plane of the ellipsoid is greater than 1.

12. The apparatus according to claim 1, wherein a material of the alignment unit structure is metal.

13. The apparatus according to claim 11, wherein a material of the alignment unit structure is a dielectric material.

14. The apparatus according to claim 13, wherein the apparatus is configured to control the electromagnetic wave reflected by the metamaterial layer.

15. The apparatus according to claim 13, wherein the apparatus is configured to control the electromagnetic wave transmitted by the metamaterial layer.

16. The apparatus according to claim 1, wherein the length-to-width ratio is greater than or equal to 5.

17. The apparatus according to claim 3, wherein the length-to-width ratio is greater than or equal to 5.

18. The apparatus according to claim 1, wherein a length-to-width ratio of a first surface of a respective alignment unit structure is greater than 1.5, the first surface being a surface that faces away from the liquid crystal layer, and wherein a length of the first surface, a width of the first surface, and a spacing between the respective alignment unit structure and an adjacent alignment unit structure are in a range of 1 nm to 5000 nm.

19. The apparatus according to claim 3, wherein a length-to-width ratio of a first surface of a respective alignment unit structure is greater than 1.5, the first surface being a surface that faces away from the liquid crystal layer.

* * * * *